United States Patent
Leonard

(10) Patent No.: US 8,382,077 B2
(45) Date of Patent: Feb. 26, 2013

(54) GAS SPRING ASSEMBLY AND METHOD

(75) Inventor: Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 978 days.

(21) Appl. No.: 12/372,503

(22) Filed: Feb. 17, 2009

(65) Prior Publication Data

US 2010/0207308 A1    Aug. 19, 2010

(51) Int. Cl.
*F16F 5/00* (2006.01)
*F16F 9/04* (2006.01)
*B25G 3/16* (2006.01)
*F16L 25/00* (2006.01)
*F16L 37/24* (2006.01)

(52) U.S. Cl. ............... 267/64.11; 267/64.21; 267/64.27; 403/349; 285/402; 285/396

(58) Field of Classification Search ............... 267/64.11, 267/64.21, 64.27; 403/349; 285/402, 396
See application file for complete search history.

(56) References Cited

U.S. PATENT DOCUMENTS

| 5,342,126 | A | 8/1994 | Heston et al. |
| 6,579,030 | B2 | 6/2003 | Uhler et al. |
| 6,978,754 | B2 | 12/2005 | Cicone |
| 7,448,823 | B2 * | 11/2008 | Silva .............................. 403/349 |
| 2003/0116898 | A1 * | 6/2003 | Leonard et al. ............ 267/64.27 |
| 2006/0267257 | A1 * | 11/2006 | Leonard ..................... 267/64.21 |

* cited by examiner

*Primary Examiner* — James Kramer
*Assistant Examiner* — Syed A Islam
(74) *Attorney, Agent, or Firm* — Jason A. Houser; Fay Sharpe LLP

(57) ABSTRACT

A gas spring assembly includes a first end member and a second end member. A flexible wall is secured between the first and second end members and at least partially defines a spring chamber therebetween. A fitting is supported on the first end member and is rotatable between a first position in which the fitting can be axially displaced and a second position in which the fitting is axially restrained. A method is also included.

17 Claims, 8 Drawing Sheets

GAS SPRING ASSEMBLY AND METHOD

BACKGROUND

The subject matter of the present disclosure broadly relates to the art of gas spring devices and, more particularly, to a gas spring assembly that includes a fitting rotatable between a first position in which the fitting can be longitudinally displaced and a second position in which the fitting is longitudinally retained. A method of assembling a gas spring assembly is also described.

The subject matter of the present disclosure finds particular application in association with gas suspension members used on suspension systems of vehicles, and will be discussed herein with particular reference thereto. However, it will be appreciated that the subject gas spring assembly and method are equally applicable for use in other applications and environments, and are not intended to be in any way limited to use in the applications discussed herein, which are merely exemplary.

Gas spring assemblies of a variety of types and kinds are well known and commonly used in a wide range of applications and operating environments, such as in vehicle suspension systems, for example. Conventional gas spring assemblies typically include one or more fittings that are secured on an end member of the gas spring assembly and can be used to connect a gas transmission line or a sensor to the gas spring assembly. The overall success and common usage of such known fittings notwithstanding, opportunities remain to improve the use and/or operation of fittings for gas spring assemblies. For example, it is believed desirable to develop a fitting that can be secured on an end member of a gas spring assembly without the use of tools while maintaining a robust and substantially fluid-tight connection with the end member. As another example, it is believed desirable to develop a fitting that can be secured on the end member without the use of tools and that will be retained on the end member when the gas spring assembly contains a quantity of pressurized gas.

As such, it is believed desirable to develop a gas spring assembly and method of assembling the same that includes one or more of the foregoing or other characteristics.

BRIEF DESCRIPTION

One example of a gas spring assembly in accordance with the subject matter of the present disclosure can include a first end member, a second end member and a flexible wall. The first end member including a longitudinally-extending passage wall that at least partially defines a passage extending through the first end member. The passage including a longitudinally-extending passage axis. The second end member is disposed in longitudinally-spaced relation to the first end member. The flexible wall extends longitudinally between opposing first and second ends. The first end is operatively secured on the first end member and the second end operatively secured on the second end member such that a spring chamber is at least partially defined therebetween. A fitting that includes a longitudinally-extending fitting body is at least partially received within the passage. The fitting is rotatable about the passage axis between a first rotational position in which the fitting is axially displaceable with respect to the first end member and a second rotational position in which the fitting is axially restrained with respect to the first end member.

Another example of a gas spring assembly in accordance with the subject matter of the present disclosure can include a first end member, a second end member and a flexible wall. The first end member includes an end member wall and an opening wall. The end member wall includes opposing first and second sides. The opening wall extends approximately transverse to the first and second sides and at least partially defines an opening extending through the end member wall. The opening has a longitudinally-extending opening axis. The second end member is disposed in longitudinally-spaced relation to the first end member. The flexible wall extends between opposing first and second ends. The first end is operatively secured on the first end member and the second end is operatively secured on the second end member such that a spring chamber is at least partially defined between the first side of the end member wall and the second end member. A fitting housing includes a housing wall with an inside surface, a first outside surface, a second outside surface and a shoulder surface that extends radially between the first and second outside surfaces. The fitting housing is received at least partially within the opening of the first end member such that the shoulder surface is in abutting engagement with the first side of the end member wall. The inside surface of the housing wall at least partially defines a passage extending longitudinally through the fitting housing. The fitting housing also includes a projection extending radially-inwardly into the passage from along the inside surface of the housing wall. The fitting includes a longitudinally-extending fitting body and at least one of a gas line connector and a sensor received within the fitting body. The fitting body includes a first end, a second end disposed in longitudinally-spaced relation to the first end, and a groove formed radially-inwardly into the fitting body that is cooperative with the projection of the fitting housing. The groove includes a first portion extending longitudinally along the fitting body and a second portion extending circumferentially around the fitting body from the first portion. The fitting is rotatable about the passage axis between a first rotational position and a second rotational position. In the first rotational position, the fitting is axially displaceable with respect to the first end member such that the fitting can be installed and removed from the passage. In the second rotational position, the fitting is axially restrained with respect to the first end member. A sealing member is compressively positioned between the fitting and the fitting housing such that a substantially fluid-tight seal is formed therebetween.

One example of a method of assembling a gas spring assembly in accordance with the subject matter of the present disclosure is provided that includes providing a gas spring assembly that includes a first end member, a second end member spaced longitudinally from the first end member and a flexible sleeve secured between the first and second end members to at least partially define a spring chamber therebetween. The first end member includes a passage formed therethrough and a first securement feature disposed along the passage. The method also includes providing a fitting including a second securement feature that is cooperative with the first engagement feature of the first end member and that is adapted to permit rotation of the fitting with respect to the first end member between a first rotational position and a second rotational position. The method further includes orienting the fitting into the first rotational position along the passage of the first end member such that the first and second securement features are approximately aligned with one another and inserting the fitting at least partially into the passage. The method also includes rotating the fitting into the second rotational position in which the fitting is longitudinally restrained with respect to the first end member.

DETAILED DESCRIPTION

Figure 1:
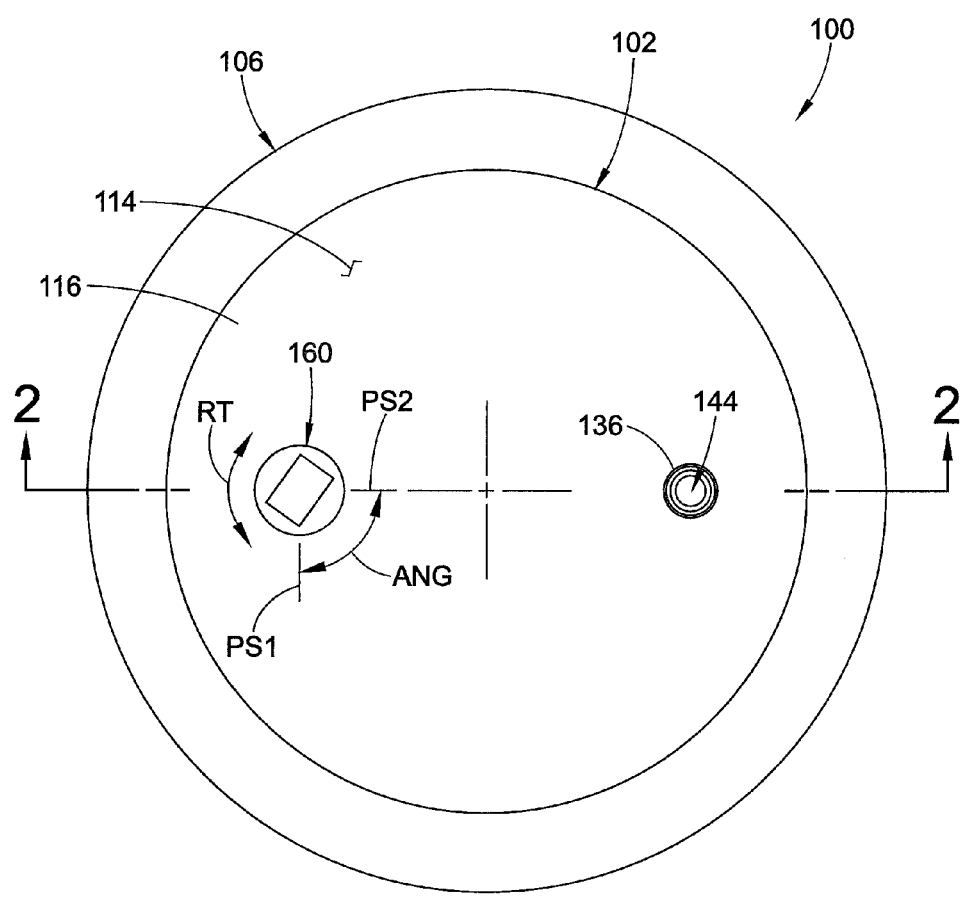
FIG. 1 is a top view of one example of a gas spring assembly in accordance with the subject matter of the present disclosure.
Figure 2:
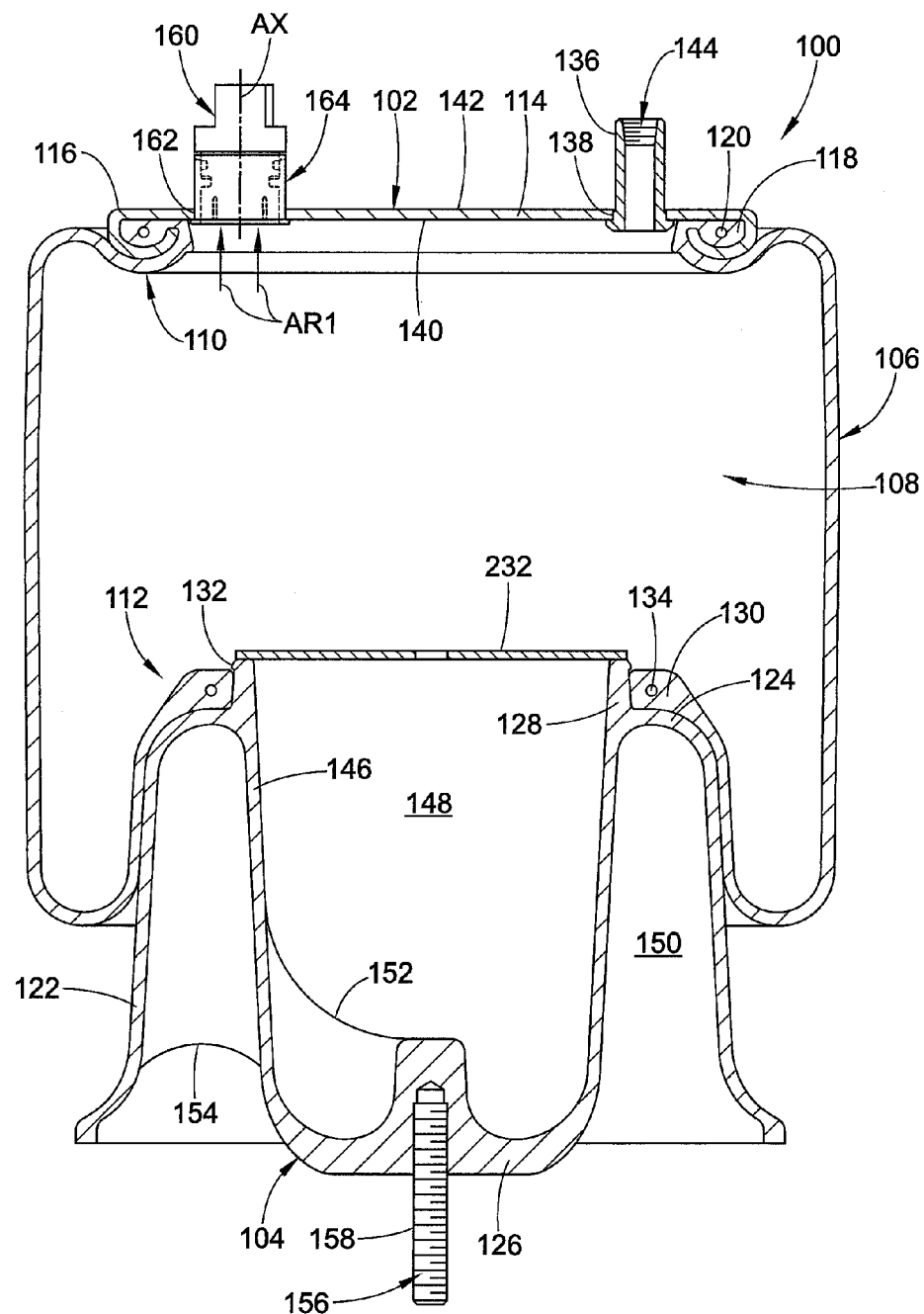
FIG. 2 is a side view, in partial cross section, of the gas spring assembly in FIG. 1 taken from along line 2-2 thereof.

Turning now to the drawings, wherein the showings are for the purpose of illustrating exemplary embodiments of the subject matter of the present disclosure only and which showings are not to be construed as being in any way limiting, FIGS. 1 and 2 illustrates a gas spring assembly 100 that includes a first end member and a second end member that is disposed in longitudinally-spaced relation to the first end member. The first and second end members can be of any suitable type, kind, configuration and/or construction. For example, the first end member is shown in FIGS. 1 and 2 as being a bead plate 102 and the second end member is shown as being a piston 104.

Gas spring assembly 100 also includes a flexible wall 106 that is secured between the first and second end members to at least partially define a spring chamber 108 therebetween. The flexible wall can be of any suitable type, kind, configuration and/or construction, such as an elongated sleeve or convoluted bellows-type design. Flexible wall 106 extends between a first end 110 and an opposing second end 112. The first end of the flexible wall is disposed toward the first end member and can be operatively secured thereto in any suitable manner. In the exemplary arrangement shown in FIGS. 1 and 2, for example, bead plate 102 is shown as having an end wall 114 with an outer peripheral wall portion 116 that is crimped around a mounting bead 118 formed along first end 110 of flexible wall 106. Mounting bead 118 can optionally include a bead wire 120 or other suitable reinforcing element.

Second end 112 of flexible wall 106 is disposed toward the second end member and can be operatively connected thereto in any suitable manner. In the exemplary arrangement shown in FIGS. 1 and 2, for example, piston 104 is shown as including an outer side wall 122, a first or inner end wall 124 and an opposing second or outer end wall 126 that is longitudinally-spaced from the first end wall. An annular mounting wall 128 can be provided that projects outwardly from first end wall 124 in a direction opposite second end wall 126 and receives a mounting bead 130 formed along second end 112 of flexible wall 106. Annular mounting wall 128 can optionally include a retaining feature, such as an annular projection 132, for example, to assist in maintaining second end 112 on piston 104. Mounting bead 130 can optionally include a bead wire 134 or other suitable reinforcing element.

It will be appreciated that a gas spring assembly, such as gas spring assembly 100, for example, will typically be installed between a pair of opposing structures or structural elements (not shown), such as opposing structural members of a vehicle, for example. As such, it will be appreciated that the first and/or second end members can be adapted for securement on an associated structure (not shown) in any suitable manner. As one example, bead plate 102 can include one or more mounting studs 136 that are secured on or along the bead plate in a suitable manner. As shown in FIGS. 1 and 2, for example, bead plate 102 includes a first opening 138 that extends through end wall 114 of the bead plate. Mounting stud 136 extends through first opening 138 such that a portion of the mounting stud is disposed along a first or inner side 140 of end wall 114 and another portion of the mounting stud is disposed along a second or outer side 142 of the end wall. A passage 144 can optionally extend through mounting stud 136 into fluid communication with spring chamber 108, such as may be used to transfer pressurized gas into and out of the spring chamber, for example. A plurality of threads (not shown) or other suitable securement features can be optionally provided along mounting stud 136.

The second end member can also include one or more features and/or components for securing the second end member on or along an associated structure (not shown). For example, piston 104 is shown in FIG. 2 as including an inner side wall 146 that extends longitudinally between first end wall 124 and second end wall 126. Inner side wall 146 at least partially defines an inner piston cavity 148 formed inside of inner side wall 146 and an outer piston cavity 150 formed between inner side wall 146 and outer side wall 122. One or more inner support walls 152 can optionally be included on piston 104 and, if provided, can extend at least partially across inner piston cavity 148 to interconnect inner side wall 146 and second end wall 126. Additionally, one or more outer support walls 154 can optionally be included on piston 104 and, if provided, can extend at least partially across outer piston cavity 150 to interconnect inner side wall 146 and outer side wall 122. For securement purposes, a mounting stud 156 or other suitable securement feature can be provided on piston 104 in any suitable manner. In the arrangement shown in FIG. 2, for example, mounting stud 156 include a first portion embedded within second end wall 126 and a second portion that projects outwardly from the second end wall and includes a plurality of threads 158 formed therealong, such as may be suitable for receiving a threaded nut or other securement component, for example.

A gas spring assembly in accordance with the subject matter of the present disclosure can also include a fitting that is supported on an end member of the gas spring assembly and can be used to removably secure a feature, device or component on the gas spring assembly. For example, a fitting could include a gas line connector, such as may be suitable for receiving and forming a substantially fluid-tight connection with an associated length of tubing. As another example, a fitting could include a sensor or sensing device, such as a height or distance sensing device, a pressure sensing device, a temperature sensing device and/or an acceleration sensing device, for example. In the latter example, such a fitting could also include an optional connector or connecting feature (not shown), such as may be suitable for operatively interconnecting an electrical conductor or wire WR (FIG. 3), for example, to the fitting, such as may be useful for providing electrical power to the sensor or sensing device and/or transmitting electrical signals and/or from such a sensor or sensing device, for example.

Figure 3:
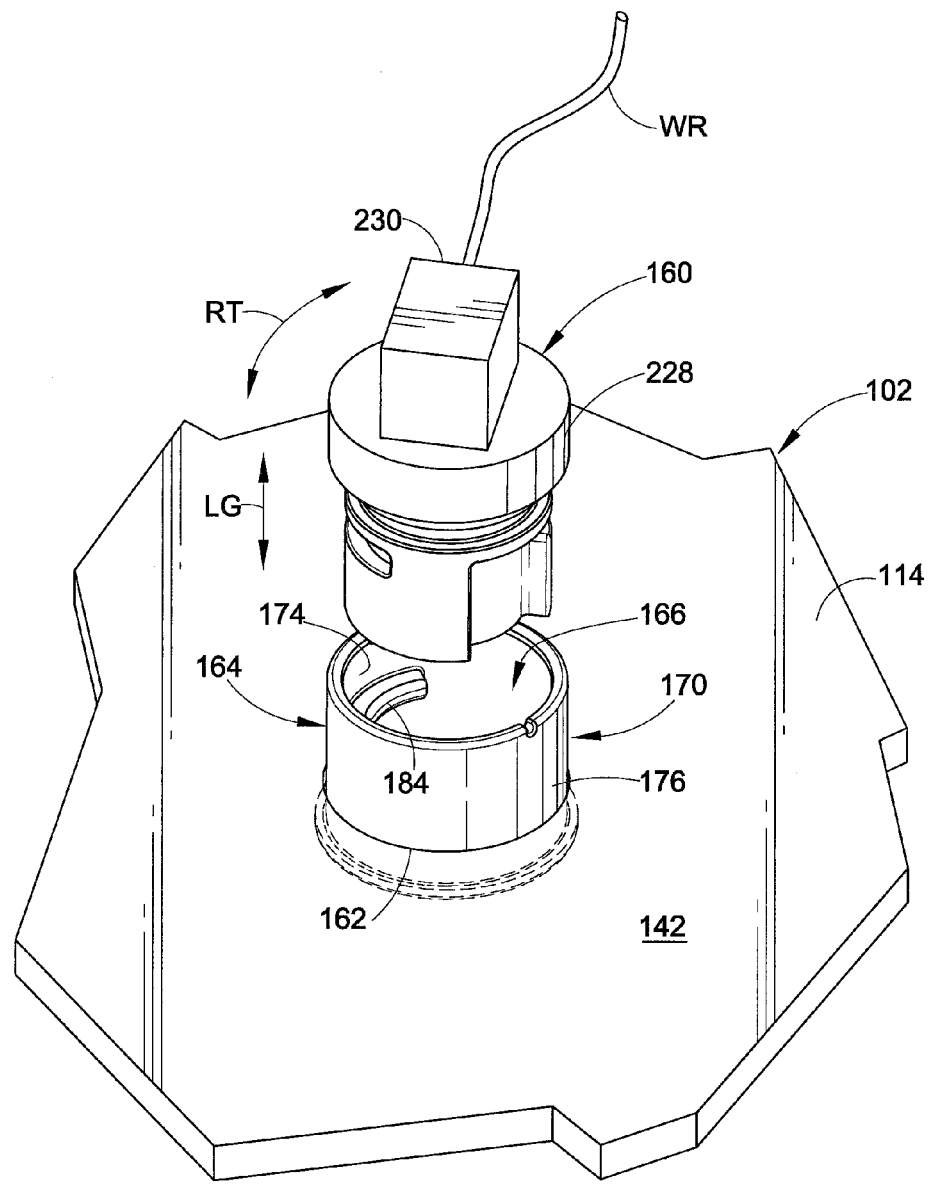
FIG. 3 is an exploded perspective view of a portion of the gas spring assembly in FIGS. 1 and 2.

As shown in FIGS. 1-3, for example, gas spring assembly 100 can include a fitting 160 that is received within a passage that extends through the first end member such that fitting 160 is in communication with spring chamber 108. It will be appreciated that the passage can be formed or otherwise provided in any suitable manner. For example, an opening 162 could be at least partially defined by an opening wall (not numbered) extending through end wall 114 of bead plate 102 in a direction generally transverse (e.g., perpendicular) to first and second sides 140 and 142, for example. As one example, opening 162 could be used as a passage for directly receiving fitting 160. As another example, a fitting housing 164 could be provided that at least partially defines a passage 166 (FIGS. 3-6) extending therethrough that is adapted to receive fitting 160. Fitting housing 164 can be supported on bead plate 102 in any suitable manner. For example, fitting housing 164 can extend through opening 162 such that a first portion of the fitting housing is disposed on or along first side 140 of the bead plate and a second portion of the fitting housing is disposed on or along second side 142 of the bead plate. Additionally, fitting housing 164 can be secured on bead plate 102 in any manner suitable for forming a substantially fluid-tight seal between the fitting housing and the bead plate, such as by using a flowed-material connection (e.g., brazing or welding), for example.

One or more features of opening 162 and/or passage 166 can at least partially define a longitudinally-extending axis AX (FIG. 2). Fitting 160 is adapted to rotate about axis AX relative to bead plate 102 and/or fitting housing 164 between a first rotational position, represented by line PS1 (FIG. 1), and a second rotational position, represented by line PS2 (FIG. 1), as is represented by arrow RT in FIGS. 1 and 3. It will be appreciated that the first and second rotational positions can be disposed at any suitable angle of rotation relative to one another, as is indicated by reference dimension ANG in FIG. 1. One example of a suitable range of angles for reference dimension ANG is from approximately 10 degrees to approximately 350 degrees of rotation, with a preferred range of angles being from approximately 30 degrees to approximately 120 degrees. Fitting 160 is also capable of longitudinal displacement with respect to bead plate 102 and/or fitting housing 164, as is represented by arrow LG in FIG. 3.

Figure 4:
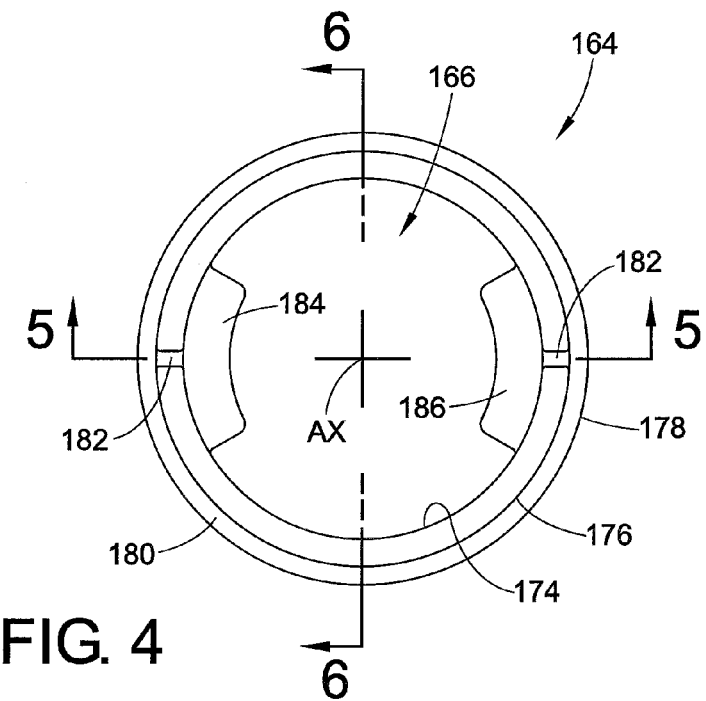
FIG. 4 is a top view of one example of a fitting housing of a gas spring assembly in accordance with the subject matter of the present disclosure.
Figure 5:
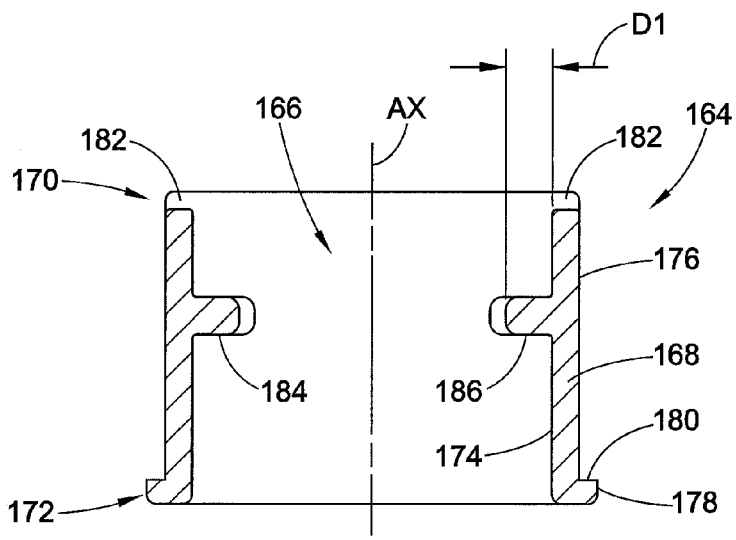
FIG. 5 is a cross-sectional side view of the fitting housing in FIG. 4 taken from along line 5-5 thereof.
Figure 6:
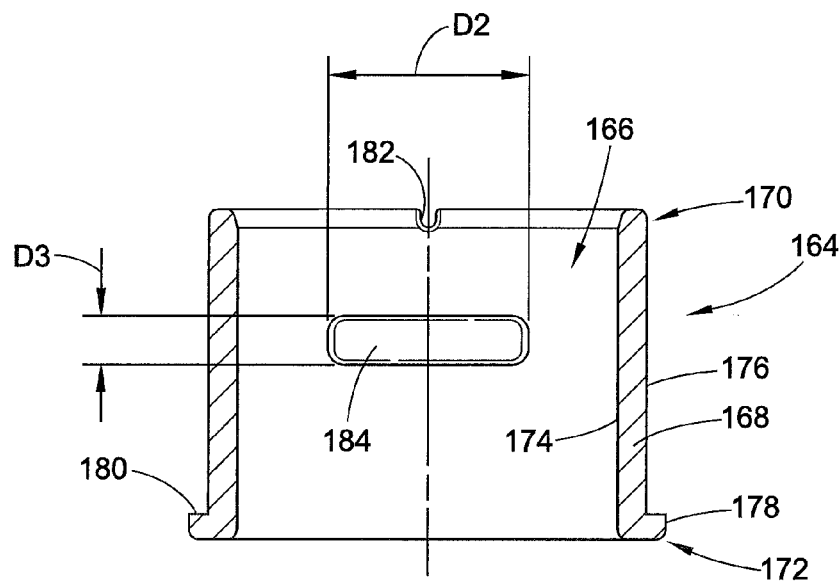
FIG. 6 is a cross-sectional side view of the fitting housing in FIG. 4 taken from along line 6-6 thereof.
Figure 7:
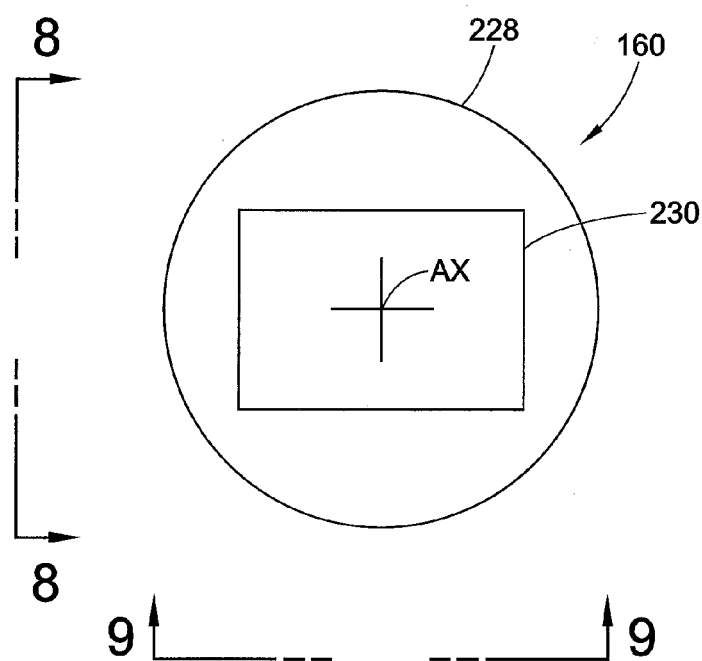
FIG. 7 is a top view of one example of a fitting of a gas spring assembly in accordance with the subject matter of the present disclosure.

Fitting housing 164 is illustrated in additional detail in FIGS. 4-6 and is shown as including a housing wall 168 that extends longitudinally between opposing first and second ends 170 and 172. Housing wall 168 includes an inner surface 174 that at least partially defines passage 166 and axis AX. Housing wall 168 also includes a first outer surface 176 disposed toward first end 170 and a second outer surface 178 disposed toward second end 172. In the exemplary arrangement shown, second outer surface is disposed radially-outwardly from first outer surface 176 such that a shoulder surface 180 extends therebetween. Fitting housing 164 can also, optionally, include one or more features and/or characteristics suitable for use in aligning fitting 160 with the fitting housing, such as for indicating orientation of the fitting with one of first or second rotational positions PS1 or PS2, for example. In the embodiment shown, an alignment notch 182 extends across housing wall 168 along first end 170 thereof.

Fitting housing 164 can be supported on end wall 114 of bead plate 102 in any suitable manner. Such as, for example, by positioning fitting housing 164 within opening 162 such that first outer surface 176 is disposed adjacent the opening wall that at least partially defines opening 162. In this manner, second outer surface 178 can be positioned within spring chamber 108 and shoulder surface 180 can abuttingly engage first side 140 of end wall 114. In this orientation, first end 170 of fitting housing 164 is disposed outwardly of spring chamber 108 and can receive fitting 160.

The first end member of a gas spring assembly in accordance with the subject matter of the present disclosure preferably includes at least one securement feature adapted to interengage a complimentary securement feature on the fitting. In the arrangement shown herein, a plurality of securement features are provided on fitting housing 164. It will be appreciated that the at least one securement feature can be of any suitable form, shape, configuration, construction and/or arrangement for receiving and retaining fitting 160 on the first end member (e.g., bead plate 102). In the exemplary arrangement shown, fitting housing 164 includes a plurality of securement features 184 and 186 that are evenly spaced about inner surface 174 of housing wall 168. As shown in FIG. 4, securement features 184 and 186 are substantially identical. However, it will be appreciated that the securement features could include one or more different features and/or characteristics that would permit fitting to be indexed or otherwise rotationally registered with respect to the first end member and/or the fitting housing. For example, the securement features could be of different shapes and/or sizes, and/or could be positioned in a non-uniform pattern or arrangement.

With further reference to FIGS. 4-6, securement features 184 and 186 take the form of projections that extend radially-inwardly from inner surface 174 of housing wall 168. The securement features have a nominal depth that is represented by reference dimension D1 in FIG. 5. The securement features also have a nominal width and a nominal thickness, which are represented in FIG. 6 by reference dimensions D2 and D3, respectively. As discussed above, it will be appreciated that the one or more securement features provided on or along the first end member (e.g., on fitting housing 164) can take any suitable shape, form, arrangement and/or configuration suitable for cooperatively interengaging fitting 160. One example of an alternate arrangement could include a plurality of smaller projections that are grouped together to form a larger overall feature, rather than being provided as a single, continuous projection, such as is represented by securement features 184 and 186, for example.

A gas spring assembly in accordance with the subject matter of the present disclosure, such as gas spring assembly 100, for example, also includes a fitting that is rotatable between a first position, in which the fitting is axially displaceable with respect to the first end member such that the fitting can be installed and removed from the passage, and a second rotational position, in which the fitting is axially restrained with respect to the first end member. It will be appreciated that the fitting can be of any type, kind, configuration and/or arrangement that is cooperative with the first end member and/or fitting housing thereof. As one example, fitting 160 is shown in FIGS. 7-11 as includes a fitting body 188 that extends longitudinally between opposing first and second ends 190 and 192. Fitting body 188 also includes a first outer surface 194 that extends from along first end 190 toward second end 192 such that a longitudinally-extending axis AX is formed therebetween.

The fitting of a gas spring assembly in accordance with the subject matter of the present disclosure, such as fitting 160, for example, preferably includes at least one securement feature that is adapted to interengage a complimentary securement feature on the first end member. It will be appreciated that the at least one securement feature can be of any suitable form, shape, configuration, construction and/or arrangement for cooperatively engaging the first end member (e.g., bead plate 102 and/or fitting housing 164 thereof). In the exemplary arrangement shown, fitting 160 includes a plurality of securement features, which are generally identified by reference numbers 196 and 198, that are evenly spaced around first outer surface 194 of fitting body 188. In the present exemplary embodiment, the securement features of fitting 160 take the form of grooves that extend inwardly into fitting body 188. In the embodiment shown in FIGS. 7-11, securement features 198 and 200 are substantially identical. However, it will be appreciated that the securement features could include one or more different features and/or characteristics that would permit fitting to be indexed or otherwise rotationally registered with respect to the first end member and/or the fitting housing. For example, the securement features could be of different shapes and/or sizes, and/or could be positioned in a non-uniform pattern or arrangement.

The grooves formed into fitting body 188, which operate as securement features 196 and 198, include a first portion 200 that extends longitudinally along fitting body 188 from first end 190 toward second end 192. First portion 200 includes a first side wall 202, an opposing second side wall 204 and a first end wall 206. The grooves also include a second portion 208 that extends circumferentially around fitting body 188 from first portion 200. Second portion 208 extends longitudinally between a second end wall 210 that is approximately aligned with first end wall 206 of first portion 200 and a third end wall 212 that is spaced from second end wall 210 in the direction of first end 190. Second portion 208 extends circumferentially around fitting body 188 between second side wall 204 and a third side wall 214.

Figure 8:
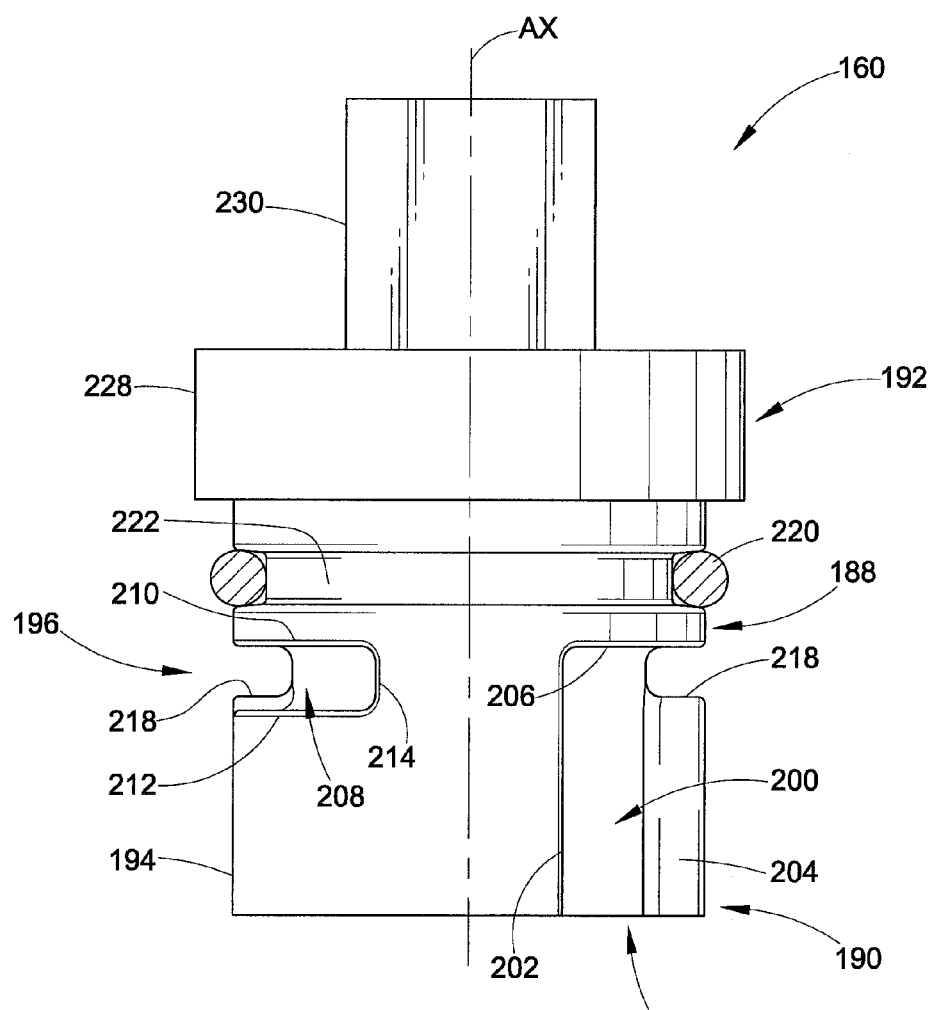
FIG. 8 is a side view of the fitting in FIG. 7 taken from along line 8-8 thereof.
Figure 9:
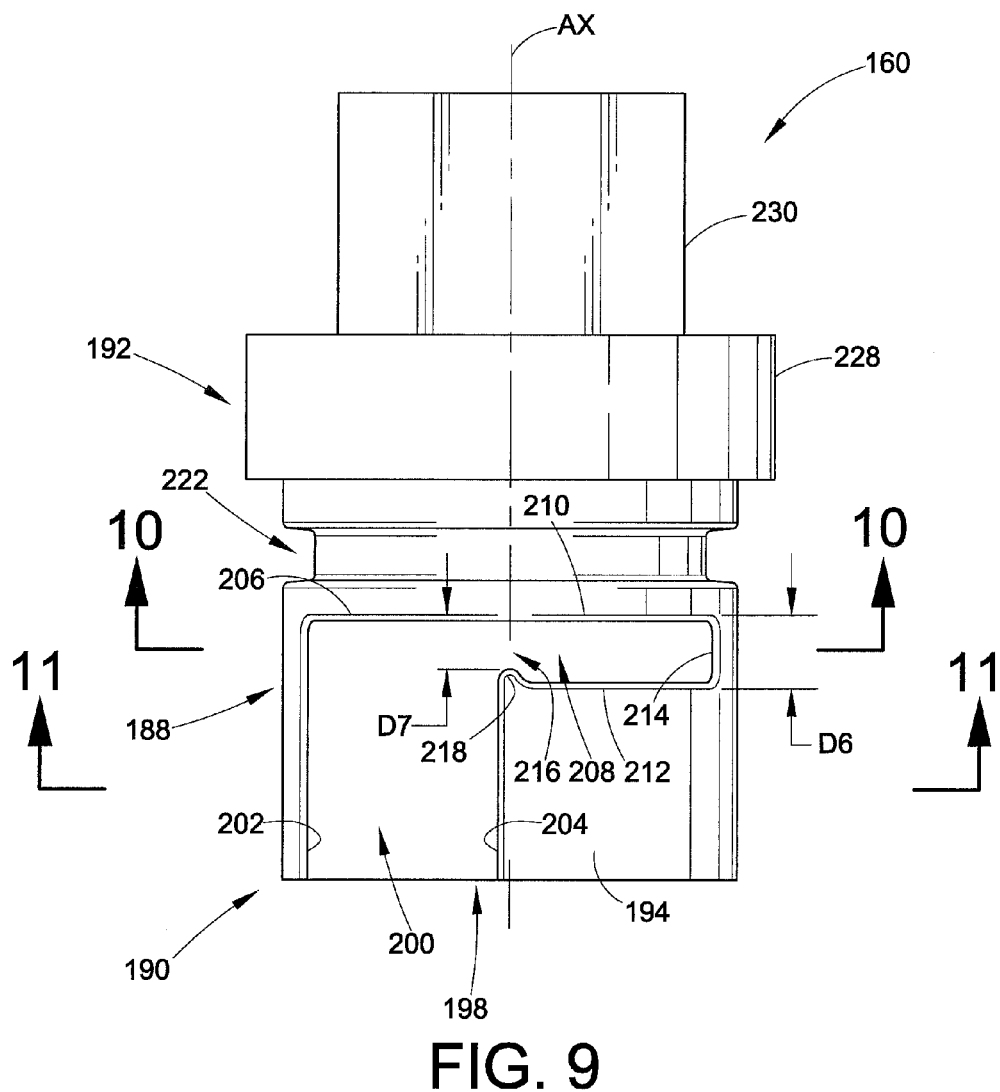
FIG. 9 is a side view of the fitting in FIG. 7 taken from along line 9-9 thereof.

Additionally, a third portion 216 of the grooves that operate as securement features 196 and 198 can optionally be included. Third portion 216 operatively connects first and second portions 200 and 208 and is disposed generally therebetween. Third portion 216 is at least partially defined by a fourth end wall 218 that is disposed in longitudinally spaced relation from second end wall 210 in a direction toward first end 190. As shown in FIGS. 8 and 9, however, it will be appreciated that fourth end wall 218 is positioned nearer to second end wall 210 than is third end wall 212. As such, a fourth side wall (not numbered) can extend between third end wall 212 and fourth end wall 218 to further define second portion 208 of the grooves.

Figure 10:
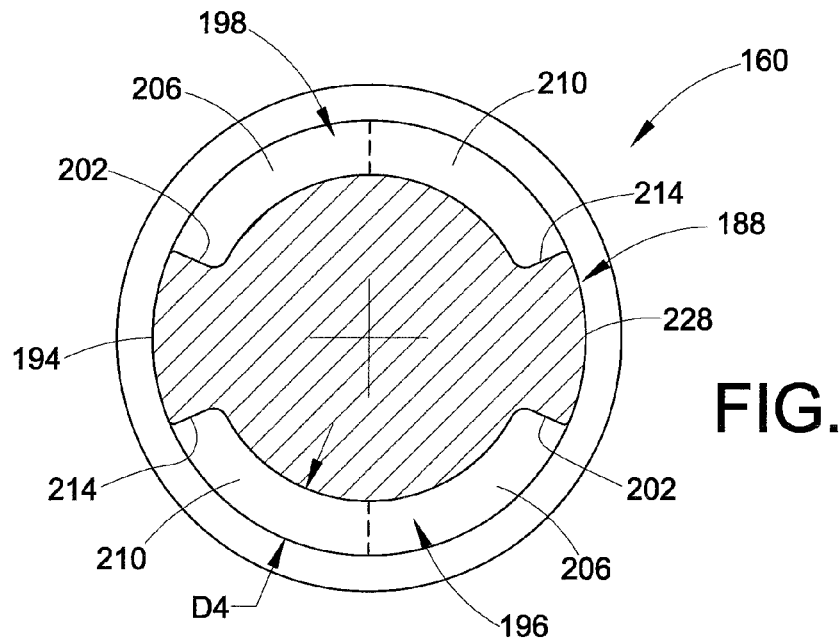
FIG. 10 is a cross-sectional view of the fitting in FIGS. 7-9 taken from along line 10-10 in FIG. 9.
Figure 11:
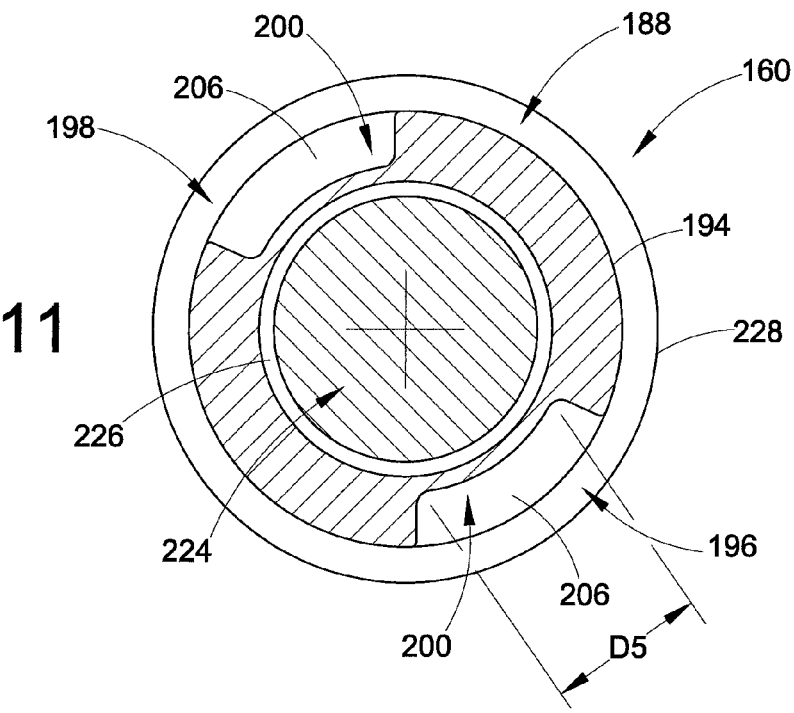
FIG. 11 is a cross-sectional view of the fitting in FIGS. 7-9 taken from along line 11-11 in FIG. 9.

As shown in FIGS. 10 and 11, the first, second and third portions of the grooves that operate as securement features 196 and 198 extend radially-inwardly into fitting body 188, as is indicated by reference dimension D4, which represents the nominal depth of the portions. It will be appreciated that nominal depth D4 of the grooves is greater than nominal depth D1 of the projections that operate as securement features 184 and 186. As such, the first, second and third portions of securement features 196 and 198 can receivably engage securement features 184 and 186 of fitting housing 164.

Additionally, first and second portions 200 and 208 have a nominal width, which is represented by reference dimension D5 in FIG. 11. Preferably, the nominal width of first and second portions 200 and 208 is greater than nominal width D2 of securement features 184 and 186 such that the same can be received within the first and second portions of the grooves. Furthermore, second portion 208 has a nominal thickness, which is represented in FIG. 9 by reference dimension D6, that is greater than nominal thickness D3 of the projections. Third portion 216 also has a nominal thickness, which is represented in FIG. 9 by reference dimension D7. However, nominal thickness D7 of third portion 216 is less than nominal thickness D6 of second portion 208.

In a preferred arrangement, nominal thickness D7 will be of sufficient size to permit the projection of securement features 184 and/or 186 to pass through third portion 216 of securement features 196 and/or 198. Because nominal thickness D6 is greater than nominal thickness D7, some additional amount of clearance will be provided once the projections are received into second portion 208 of securement features 196 and 198. Upon filling spring chamber 108 with a quantity of pressurized gas, the gas pressure will act on first end 190 of fitting 160 and urge the fitting outwardly along passage 166 in a longitudinal direction away from spring chamber 108, as indicated by arrows AR1 in FIG. 2. Such a longitudinal movement of fitting 160 will cause the fourth side wall (not numbered) formed between third and fourth end walls 212 and 218 to interengage the projection received within second portion 208 and thereby prevent rotation of the fitting while the gas spring assembly is pressurized. An sealing member, such as an o-ring 220 (FIG. 8), for example, can be included on or along fitting 160 and/or fitting housing 166 to form a substantially fluid-tight seal therebetween. In the exemplary arrangement shown, fitting 160 includes a channel 222 (FIG. 9) formed radially-inwardly into fitting body 188 that is adapted to receive o-ring 220.

Fitting 160 can be installed on fitting housing 164 by orienting the respective securement features thereof in approximate alignment with one another and longitudinally displacing the fitting into passage 166 of the fitting housing. Once fitting 160 is inserted to a full or otherwise desired longitudinal extent, the fitting can be rotated from the first rotational position into the second rotational position in which the securement features are interengaged with one another such that the fitting is longitudinally retained within the fitting housing. The gas spring assembly can then be filled with a quantity of pressurized gas for use in a conventional manner. As discussed above, the subject fitting arrangement is retained in the second rotational position when the gas spring assembly is pressurized. Upon releasing the pressurized gas from within the gas spring assembly, fitting 160 is capable of longitudinal movement within second portion 208 such that the projections can be at least approximately aligned with third portion 216 for rotation of the fitting into the first rotational position for removal from the fitting housing.

As discussed above, fitting 160 can be of any suitable type, kind, configuration and/or arrangement and can include any suitable components and/or features, such as a gas line connector and/or a sensor or sensing device, for example. In the exemplary arrangement shown herein, fitting 160 includes a sensor device 224 (FIG. 11) that is embedded or otherwise at least partially received within fitting body 188. In one preferred arrangement, fitting body 188 includes a chamber 226 (FIG. 11) that permits sensor device to be at least partially exposed along first end 190 of fitting body 188. Additionally, fitting body 188 can optionally include a second outer surface 228 that is spaced radially-outwardly from first outer surface 194. Furthermore, a connector portion 230 can extend longitudinally-outwardly from fitting body 188 in a direction away from first end 190. Connector portion 230 can include any suitable components and/or devices for interfacing sensor device 224 with conductors or communication lines, such as wire WR (FIG. 3), for example.

In some cases, a distance sensing device, such as an ultrasonic distance sensor, may be used as sensor device 224. In such case, a cover plate 232 or other suitable component can optionally be included within gas spring assembly 100, such as to reflect ultrasonic waves in a favorable manner, for example. It will be appreciated, that any such cover plate or other component can take any suitable form and can be secured on or along an end member of other component in any suitable manner.

As used herein with reference to certain elements, components and/or structures (e.g., "first side wall" and "second side wall"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring assembly comprising:
    a first end member including a longitudinally-extending passage wall at least partially defining a passage that extends through said first end member and includes a longitudinally-extending passage axis;
    a second end member disposed in longitudinally-spaced relation to said first end member;
    a flexible wall extending longitudinally between opposing first and second ends, said first end operatively secured on said first end member and said second end operatively secured on said second end member such that a spring chamber is at least partially defined therebetween; and,
    a fitting including a longitudinally-extending fitting body at least partially received within said passage, said fitting rotatable about said passage axis between a first rotational position in which said fitting is axially displaceable with respect to said first end member and a second rotational position in which said fitting is axially restrained with respect to said first end member,
    wherein said spring chamber includes a quantity of pressurized gas in fluid communication with said fitting such that said fitting is urged axially-outwardly along said passage with respect to said spring chamber which restricts rotational displacement of said fitting about said passage axis and thereby retains said fitting in said second rotational position.

2. A gas spring assembly according to claim 1, wherein said fitting includes at least one of a gas line connector or a sensor and an electrical conductor in communication with said sensor.

3. A gas spring assembly according to claim 2, wherein said fitting includes a sensor, and said sensor includes at least one of a distance sensing device, pressure sensing device, temperature sensing device or an acceleration sensing device.

4. A gas spring assembly according to claim 1, wherein said first end member includes a first engagement feature formed along said passage, said first engagement feature including at least one of a first projection or a first groove, said fitting includes a second engagement feature formed along said fitting body, said second engagement feature including at least one of a second groove complimentary to said first projection of said first engagement feature or a second projection complimentary to said first groove.

5. A gas spring assembly according to claim 4, wherein said first engagement feature of said first end member includes said first projection and said second engagement feature of said fitting includes said second groove, said first projection extending radially-inwardly from along said passage wall, and said second groove extending radially-inwardly into said fitting body.

6. A gas spring assembly according to claim 5, wherein said second groove includes a first portion extending longitudinally along said fitting body and a second portion extending peripherally around said fitting body.

7. A gas spring assembly according to claim 6, wherein said first projection has a first nominal width and a first nominal thickness, said first portion of said second groove has a second nominal width greater than said first nominal width of said first projection, and said second portion of said second groove has a second nominal thickness that is greater than said first nominal thickness.

8. A gas spring assembly according to claim 7, wherein said second groove includes a third portion operatively interconnecting said first and second portions, said third portion having a third nominal thickness that is greater than said first nominal thickness of said first projection and less than said second nominal thickness of said second portion of said second groove.

9. A gas spring assembly according to claim 1 further comprising a sealing member operatively engaging said passage wall and said fitting body to form a substantially fluid-tight seal therebetween.

10. A gas spring assembly according to claim 1, wherein said first end member includes an opening wall at least partially defining an opening extending through said first end member in spaced relation to said passage, said opening adapted for use in transferring pressurized gas to and from said spring chamber.

11. A gas spring assembly according to claim 1, wherein said first end member includes an end wall and a fitting housing, said end wall including an opening wall at least partially defining an opening extending through said end wall, said fitting housing at least partially received within said opening and secured on said end wall such that a substantially fluid-tight seal is formed therewith, said fitting housing including said passage wall such that said passage extends therethrough.

12. A gas spring assembly comprising:
    a first end member including an end member wall and an opening wall, said end member wall including opposing first and second sides, said opening wall extending approximately transverse to said first and second sides and at least partially defining an opening extending through said end member wall, said opening having a longitudinally-extending opening axis;
    a second end member disposed in longitudinally-spaced relation to said first end member;
    a flexible wall extending between opposing first and second ends, said first end operatively secured on said first end member and said second end operatively secured on said second end member such that a spring chamber is at least partially defined between said first side of said end member wall and said second end member;

a fitting housing including a housing wall with an inside surface, a first outside surface, a second outside surface and a shoulder surface extending radially between said first and second outside surfaces, said fitting housing received at least partially within said opening of said first end member such that said shoulder surface is in abutting engagement with said first side of said end member wall, and said inside surface of said housing wall at least partially defining a passage extending longitudinally through said fitting housing, and said fitting housing including a projection extending radially-inwardly into said passage from along said inside surface of said housing wall;

a fitting including a longitudinally-extending fitting body and at least one of a gas line connector and a sensor received within said fitting body, said fitting body including a first end, a second end disposed in longitudinally-spaced relation to said first end and a groove formed radially-inwardly into said fitting body and cooperative with said projection of said fitting housing, said groove including a first portion extending longitudinally along said fitting body and a second portion extending circumferentially around said fitting body from said first portion, said fitting rotatable about said passage axis between a first rotational position and a second rotational position such that:

in said first rotational position, said fitting is axially displaceable with respect to said first end member such that said fitting can be installed and removed from said passage; and, in said second rotational position, said fitting is axially restrained with respect to said first end member; and, a sealing member compressively positioned between said fitting and said fitting housing such that a substantially fluid-tight seal is formed therebetween, wherein said spring chamber contains a quantity of pressurized gas in fluid communication with said second end of said fitting such that said fitting is urged longitudinally-outwardly thereby and said second side wall of second portion of said groove is positioned to abuttingly engage at least a portion of said projection of said fitting housing and thereby prevent displacement of said fitting from said second rotational position to said first rotational position.

13. A gas spring assembly according to claim 12, wherein said projection has a nominal width and a nominal thickness, said first portion of said groove has a nominal width that is greater than said nominal width of said projection, said second portion of said groove has a nominal thickness that is greater than said nominal thickness of said projection.

14. A gas spring assembly according to claim 13, wherein said groove of said fitting body includes a third portion operatively interconnecting said first and second portions, said third portion having a nominal thickness that is greater than said nominal thickness of said projection and less than said nominal thickness of said second portion.

15. A gas spring assembly according to claim 14, wherein a periphery of said second portion of said groove includes a first end wall, a second end wall spaced longitudinally toward said second end of said fitting body relative to said first end wall, a first side wall extending between said first and second end walls and a second side wall extending between said second side wall and said third portion of said groove.

16. A method of assembling a gas spring assembly, said method comprising:
a) providing gas spring assembly that includes a first end member, a second end member spaced longitudinally from said first end member and a flexible sleeve secured between said first and second end members to at least partially define a spring chamber therebetween, said first end member including a passage formed therethrough and a first securement feature disposed along said passage;
b) providing a fitting including a second securement feature cooperative with said first engagement feature of said first end member and adapted to permit rotation of said fitting with respect to said first end member between a first rotational position and a second rotational position;
c) orienting said fitting into said first rotational position along said passage of said first end member such that said first and second securement features are approximately aligned with one another and inserting said fitting at least partially into said passage;
d) rotating said fitting into said second rotational position in which said fitting is longitudinally restrained with respect to said first end member; and
e) pressurizing said spring chamber with a quantity of pressurized gas such that said fitting is urged outwardly with respect to said first end member causing longitudinal interengagement between said first and second securement features and thereby preventing rotation of said fitting from said second rotational position into said first rotational position.

17. A method according to claim 16 further comprising:
f) releasing said quantity of gas from said spring chamber to depressurize said gas spring assembly and thereby longitudinally-disengaging said first and second securement features to enable rotation of said fitting from said second rotational position to said first rotational position.

* * * * *